United States Patent [19]

Rosbach

[11] 4,253,637
[45] Mar. 3, 1981

[54] DEVICE FOR MOLDING STRUCTURAL ELEMENTS OF TOYS

[76] Inventor: Hannelore Rosbach, Karl Spitta Strasse 2, 8430 Neumarkt Opf., Fed. Rep. of Germany

[21] Appl. No.: 131,892

[22] Filed: Mar. 20, 1980

[30] Foreign Application Priority Data

Dec. 10, 1979 [EP] European Pat. Off. ........ 79105018.0

[51] Int. Cl.³ .............................................. B28B 7/02
[52] U.S. Cl. ................................... 249/158; 249/168; 425/DIG. 57
[58] Field of Search ....................... 249/13, 18, 26, 27, 249/33, 48, 49, 50, 158, 194, 219 R, 155, 168; 425/DIG. 57

[56] References Cited

U.S. PATENT DOCUMENTS

| | | | |
|---|---|---|---|
| 896,330 | 8/1908 | Scheelky | 249/158 X |
| 1,090,583 | 3/1914 | Venable | 249/158 X |
| 1,951,949 | 3/1934 | Provance | 249/48 X |
| 2,583,626 | 1/1952 | Buell | 249/50 X |
| 2,674,888 | 4/1954 | Simonet | 249/158 X |
| 2,721,368 | 10/1955 | Landrum | 249/158 |
| 2,874,442 | 2/1959 | Henderson | 249/50 |
| 2,916,795 | 12/1959 | Henderson | 249/50 X |
| 3,063,122 | 11/1962 | Katz | 249/50 |
| 3,964,727 | 6/1976 | Gladwin | 249/158 |
| 4,159,100 | 6/1979 | Landowski | 249/158 X |

*Primary Examiner*—J. Howard Flint, Jr.
*Attorney, Agent, or Firm*—Bacon & Thomas

[57] ABSTRACT

A device for molding of toy structural elements of hardenable or polymerizable materials for constructional toys. Clamping rails are arranged on a base plate spaced apart but parallel to each other and secured to the base plate in an adjustable manner. Between the clamping rails, a plurality of end pieces or molding pieces are located; they are releasably secured to the base plate by means of the clamping rails.

13 Claims, 23 Drawing Figures

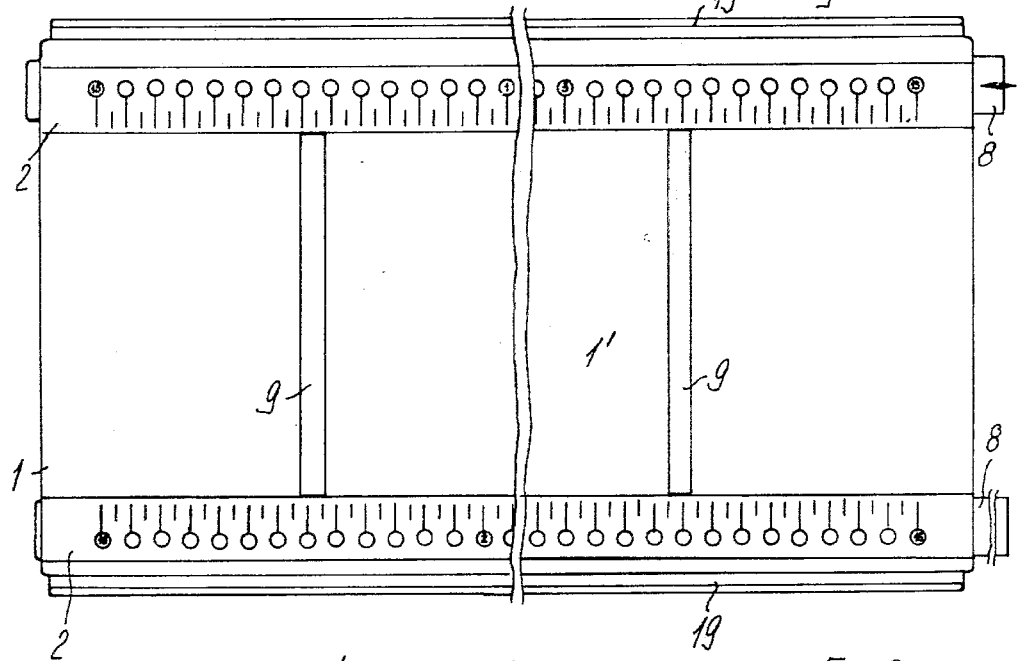
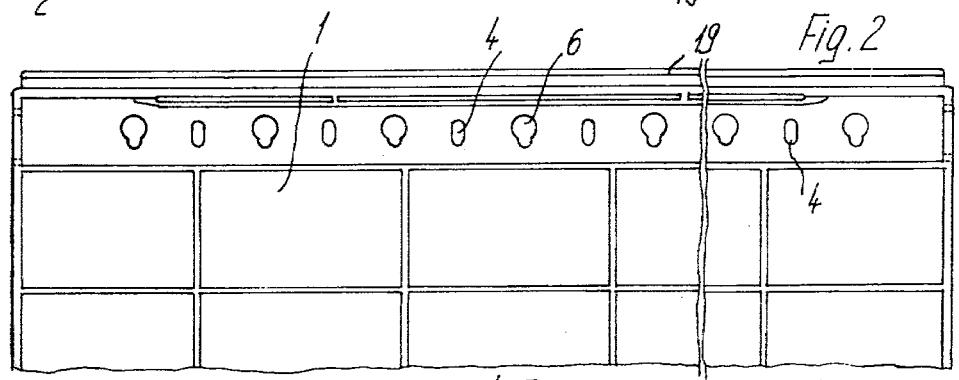
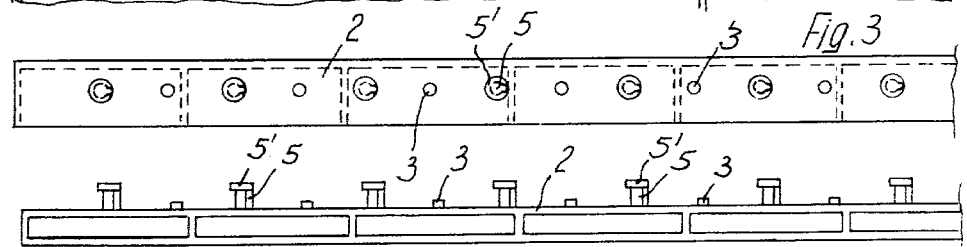
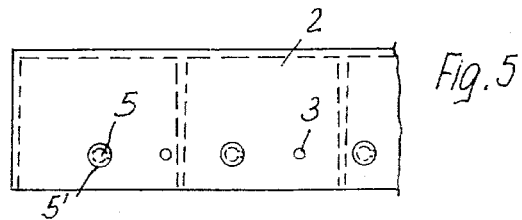

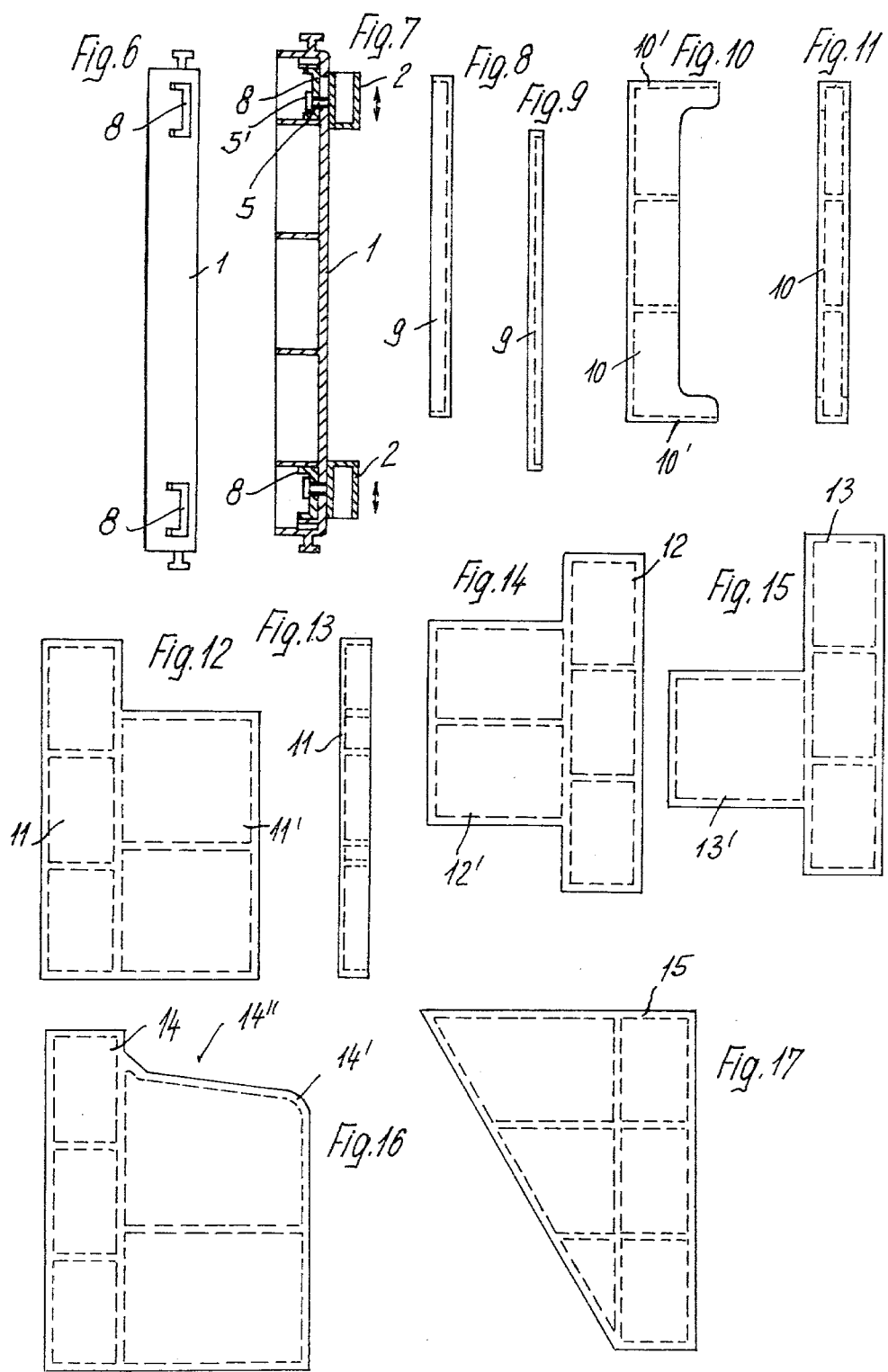

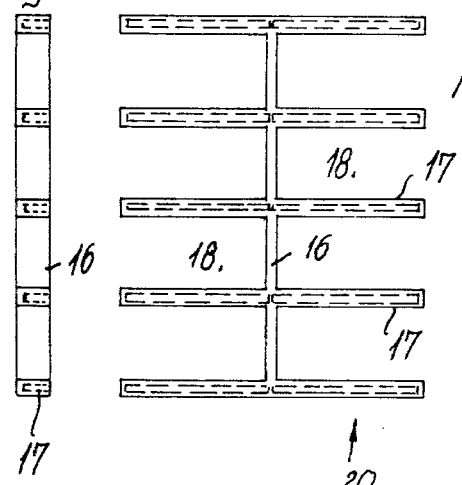
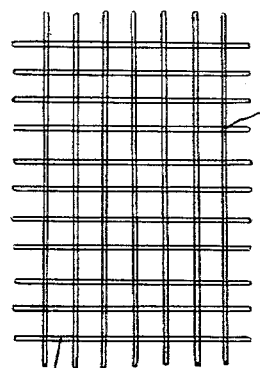

DEVICE FOR MOLDING STRUCTURAL ELEMENTS OF TOYS

BACKGROUND OF THE INVENTION

The invention concerns a device for the molding of structural elements of toys from hardenable or polymerizable materials for construction toys.

It is known to mold structural elements for use in toys in a single or multiple part molding boxes. The molding boxes have the disadvantage that changes with respect to size and configuration may be effected with difficulty or not at all.

SUMMARY OF THE INVENTION

It is an object of the present invention to provide a device for the molding of structural elements for toys of any configuration and/or size.

This object is attained according to the invention by providing a base plate with clamping rails arranged on said base plate in an adjustably fixed manner, parallel to and at a distance from each other, and with end and molding pieces freely placed upon said ground plate and between the clamping rails, said end and molding pieces being releasably secured by the clamping rails. In the device, the clamping rails form together with the end or molding pieces a plurality of adjustable and immobilizable mold walls to create molding boxes of any size or configuration. By moving the clamping rails and the end and molding pieces and by the combination of suitable end or molding pieces, replicas, on a reduced scale, of structural that may be desired.

The clamping rails, designed selectively with identical or different widths and/or heights may be guided and held on the base plate in any suitable manner. According to a preferred embodiment of the device, the clamping rails may be adjusted and held on the base plate by means of slotted slides guided on the base plate, whereby the clamping rails, for example, engage a plurality of holes provided in the base plate with holding and guide pins fixedly mounted on said rails, the holding and guide pins also penetrating the slots of the slotted slides and extending under the limiting surfaces of the slots of the slides. It is also possible, within the scope of the invention, to adjustably hold the clamping rails in position by other means, for example, by arresting bodies or clamping elements, such as bolts, on the base plate. The base plate itself may consist of a flat, solid body or a hollow body open, for example, on the bottom side. Conveniently the base plate may be provided, in order to facilitate the handling of the device, with handles or gripping ledges projecting over the circumferential surface of said base plate.

It is the concept of the invention that the use of different end and molding pieces makes it possible to mold different structural elements of toys. The end pieces thus may consist of solid or hollow gibs of different widths, heights and cross sections, or of shapes, for example, of a U-profile, the legs whereof assure the secure holding together with an aligning effect for the end pieces designed in this manner, by means of large area contact with the guide rails.

The molding pieces may also consist of gibs equipped on one or both sides with cross ties, which in combination with arbitrary end pieces provide a plurality of molding boxes for the simultaneous molding of a corresponding number of structural elements of toys. The molding pieces may also consist of a panelled framework with extensions or recesses, which together with end pieces or molding pieces, in keeping with their configuration, make it possible to produce, for example, wall sections with door and/or window openings, door and window lintels, gable walls, portions of gables or the like, with the device.

Finally, in order to stabilize the structural elements, reinforcements may be used. For this purpose, screens may be placed in the molding boxes, to be supported in intervals by means of shoulders on the base plate.

BRIEF DESCRIPTION OF THE DRAWINGS

The invention will be explained with the aid of examples of embodiments in the drawing attached hereto. In the drawings:

FIG. 1 is a top view of a base plate with clamping rails and two molding pieces;

FIG. 2 is a bottom view of a part of a base plate;

FIG. 3 is a bottom view of a part of a clamping rail in a small configuration;

FIG. 4 is a rear view of a clamping rail of FIG. 3;

FIG. 5 is a botton view of a part of a clamping rail of a wide configuration;

FIG. 6 is a device without clamping rails, shown in side elevation;

FIG. 7 is a cross section of a device;

FIG. 8 is an end piece, shown in side elevation;

FIG. 9 is a top view of an end piece of FIG. 8;

FIG. 10 is a top view of an end piece of a different configuration;

FIG. 11 is an end piece of FIG. 10, shown in side elevation;

FIG. 12 is a top view of a molding piece;

FIG. 13 is a molding piece of FIG. 12, shown in side elevation;

FIG. 14 is a top view of a molding piece of a different configuration;

FIG. 15 is a top view of a molding piece of still another configuration;

FIG. 16 is a top view of another molding piece;

FIG. 17 is a molding piece in keeping with a different design;

FIG. 18 is a top view of a molding piece to form several molding boxes;

FIG. 19 is a top view of a molding piece of FIG. 18;

FIG. 20 is a top view of a slotted slide;

FIG. 21 is a slotted slide, shown in elevation;

FIG. 22 is a top view of a reinforcing screen; and

FIG. 23 is a side elevation of a reinforcing screen.

DESCRIPTION OF PREFERRED EMBODIMENTS

In the device shown in FIGS. 1, 2, 6 and 7, the symbol 1 designates a base plate 1 of a hollow configuration and made of a synthetic plastic material. Clamping rails 2 displaceable in a direction parallel to each other are arranged on the base plate 1 (FIGS. 3, 4 and 5), said clamping rails engaging the holes 4 of the base plate 1 with their guide pins 3 and penetrating the holes 6 of the base plate 1 and the slots 7 (FIG. 20) of the slotted slides 8 guided in the base plate 1, by means of holding pins 5 (FIGS. 3 and 4). Further, the holding pins 5 project with their heads 5' under the boundary surfaces of the slots 7. During the longitudinal motion of the slotted slides 7, the holding pins 5 slide into the obliquely shaped slots 7 and clamping rails 2 move in the transverse direction. Between the two clamping rails 2, giblike end pieces 9 (FIGS. 8 and 9), and/or U-shaped end pieces 10 (FIGS. 10 and 11) may be placed on the base plate and may be secured to the base plate by means of the clamping rails 2. The clamping rails 2 form, together with the end pieces 9 and/or 10 and the section 1' of the base plate, a molding box for the molding of toy structural elements. It should be understood that by means of the end pieces 9 and 10, toy structural elements with straight side walls may be produced. The abutment of the legs 10' of the end pieces 10 against the clamping rails 2 results in the automatic alignment of the end pieces 10 with the clamping rails 2, said alignment being rectangular in the present example of embodiment.

Between the clamping rails 2, there may be further placed the molding pieces 11, 12 and/or 13 (FIGS. 12, 13, 14 and 15) and the molding pieces 14 and 15, respectively (FIGS. 16 and 17), on the base plate and immobilized by the clamping rails 2. The molding pieces 11 to 15 in particular are designed as unilaterally covered panel frame structures and have lateral extensions 11', 12', 13', 14', which in combination with the end pieces 9, 10 applied at a distance, make possible the molding of wall sections with door or window openings. The use of molding pieces with extensions 11', 12', 13', 14' of different dimensions results in window and door openings of different size.

The molding piece 15 (FIG. 17) provides for the molding of wall sections which oblique boundary surfaces, for example, gable walls, and the molding piece 14 in the area of the recess 14", the molding of door and window lintels as additional toy structural elements. Potentially associated end pieces 9 or 10 close the molding boxes for wall sections and door and window lintels.

FIGS. 18 and 19 show a molding piece formed by a gib 16 with the cross tie 17 extending transversely to the gib; the molding piece may be clamped in combination with the end pieces 9 or 10 between the clamping rails 2 and provides a plurality of molding boxes for the molding of ashlar shaped structural elements. To facilitate the handling of the device, gripping ledges 19, projecting beyond the circumferential surface of the base plate 1 are provided.

In order to produce toy structural elements, for example, the end pieces 9, 10 or molding pieces 11 to 15 or 20, selectively, are placed between the clamping rails 2, wherein several end or molding pieces may be provided for the simultaneous forming of a plurality of molding boxes 18. The end or molding pieces are immobolized on the base plate 1 by means of pressure applied to the clamping rails 2 through the longitudinal motion of the slotted slides 8, tightly closing the molding box or boxes around their circumference. Following the hardening or polymerizing of the material placed in the molding boxes, the clamping rails 2 may be moved apart by reversing movement of the slides 8 and the toy structural elements and the end and/or molding pieces may be removed from the base plate 1. In addition to the fact that the device makes it possible to mold toy structural elements of any configuration, it may be easily cleaned after the completion of the molding process. It is within the scope of the invention to secure the clamping rails releasably to the base plate 1 in any other manner, for example, by clamping elements or locking bodies known in themselves.

Finally, it is possible to fasten the clamping rails 2 and the end or molding pieces to the base plate 1 simply by means holding pins entering holes in said base plate 1.

The stability of the toy structural elements may be further improved by the insertion of a reinforcing screen 21 (FIGS. 22 and 23) in the molding boxes. To insure the enclosure of the reinforcing screen 21 in the material, it may be supported against the base plate 1 by means of, for example, pin-shaped projections 22, at intervals.

I claim:

1. A device for molding toy structural elements from hardenable or polymerizable materials, comprising: a base plate with clamping rails thereon arranged parallel to and spaced from each other, means releasably holding said rails to said base plate in selected positions in a fixed manner, and a plurality of end molding pieces placed freely on the base plate and secured releasably to said base plate by means of pressure thereon by the clamping rails.

2. Device according to claim 1, wherein said releasable holding means comprises slotted sides guided on the base plate whereby the clamping rails may be adjusted laterally and immobilized on the base plate.

3. Device according to claim 2, wherein said releasable holding means comprises holding and guide pins fixedly attached to said clamping rails to engage holes in the base plate whereby the clamping rails engage the base plate and wherein the holding pins penetrate the slots of the slotted sides and extend with enlarged heads under the boundary surfaces of the slots.

4. Device according to claim 1, wherein said holding means comprises locking members on the base plate whereby the clamping rails may be immobilized.

5. Device according to claim 1, wherein the clamping rails are held adjustably on the base plate by means of clamping members.

6. Device according to claim 1 wherein the clamping rails have different heights and/or widths.

7. Device according to claim 1, wherein the base plate has handles or gripping ledges projecting outwardly of its circumferential surface.

8. Device according to claim 1, wherein the end pieces consist of gibs having different widths, heights and cross sections.

9. Device according to claim 1, wherein the end pieces consist of essentially U-shaped molding elements.

10. Device according to claim 1, wherein the molding piece consists of a gib provided on at least one side with spaced cross ties.

11. Device according to claim 1, wherein the molding pieces consist of panel frames with configurations to form window or door openings, window or door lintels, walls or sections of walls.

12. Device according to claim 1, wherein between the clamping rails and the end a molding pieces, reinforcing screens are arranged on the base plate.

13. Device according to claim 12, wherein the reinforcing screens are supported against the base plate by means of shoulders spaced from each other.

* * * * *